US007505915B2

(12) United States Patent
Silverman et al.

(10) Patent No.: US 7,505,915 B2
(45) Date of Patent: *Mar. 17, 2009

(54) NEGOTIATED MATCHING SYSTEM (75) Inventors: David L. Silverman, Saint James, NY (US); William L. Donner, London (GB); Christopher J. Ordish, Surrey (GB)

(73) Assignee: Reuters Limited (GB)

( * ) Notice: Subject to any disclaimer, the term of this patent is extended or adjusted under 35 U.S.C. 154(b) by 635 days.

This patent is subject to a terminal disclaimer.

(21) Appl. No.: 10/266,939

(22) Filed: Oct. 9, 2002

(65) Prior Publication Data
US 2003/0061069 A1 Mar. 27, 2003

Related U.S. Application Data (60) Continuation of application No. 09/313,216, filed on May 18, 1999, now abandoned, which is a division of application No. 08/475,499, filed on Jun. 7, 1995, now Pat. No. 5,924,082.

(30) Foreign Application Priority Data
Aug. 17, 1994 (GB) ................................. 9416673.3

(51) Int. Cl.
*G06Q 99/00* (2006.01)
(52) U.S. Cl. ............................................. 705/1; 705/37
(58) Field of Classification Search .................. 705/1, 705/35, 37, 38
See application file for complete search history.

(56) References Cited

U.S. PATENT DOCUMENTS 3,573,747 A 4/1971 Adams et al.
4,376,978 A 3/1983 Musmanno
4,412,287 A 10/1983 Braddock, III
4,525,779 A 6/1985 Davids et al.

(Continued)

FOREIGN PATENT DOCUMENTS

EP 0 399 850 11/1990

(Continued)

OTHER PUBLICATIONS

Securities Week: "AMEX Wants Trade or Fade Rule to Get Best Price for Multiply Traded Options"; Aug. 9, 1993, vol. 20, No. 32, p. 8.*

(Continued)

*Primary Examiner*—Dennis Ruhl
(74) *Attorney, Agent, or Firm*—Banner & Witcoff, Ltd.

(57) ABSTRACT

A negotiated matching system includes a plurality of remote terminals associated with respective potential counterparties, a communications network for permitting communication between the remote terminals, and a matching station. Each user enters trading information and ranking information into his or her remote terminal. The matching station then uses the trading and ranking information from each user to identify transactions between counterparties that are mutually acceptable based on the ranking information, thereby matching potential counterparties to a transaction. Once a match occurs, the potential counterparties transmit negotiating messages to negotiate some or all terms of the transaction. Thus, the negotiated matching system first matches potential counterparties who are acceptable to each other based on trading and ranking information, and then enables the two counterparties to negotiate and finalize the terms of a transaction.

42 Claims, 6 Drawing Sheets

U.S. PATENT DOCUMENTS

| | | |
|---|---|---|
| 4,531,184 A | 7/1985 | Wigan et al. |
| 4,555,781 A | 11/1985 | Baldry et al. |
| 4,677,552 A | 6/1987 | Sibley, Jr. |
| 4,745,559 A | 5/1988 | Willis et al. |
| 4,750,135 A | 6/1988 | Boilen |
| 4,775,935 A | 10/1988 | Yourick |
| 4,799,156 A | 1/1989 | Shavit et al. |
| 4,903,201 A | 2/1990 | Wagner |
| 4,980,826 A | 12/1990 | Wagner |
| 5,034,916 A | 7/1991 | Ordish |
| 5,038,284 A | 8/1991 | Kramer |
| 5,077,665 A | 12/1991 | Silverman et al. |
| 5,101,353 A | 3/1992 | Lupien et al. |
| 5,136,501 A * | 8/1992 | Silverman et al. ............ 705/37 |
| 5,168,446 A * | 12/1992 | Wiseman .................... 705/37 |
| 5,243,331 A | 9/1993 | McCausland et al. |
| 5,297,031 A | 3/1994 | Gutterman et al. |
| 5,305,200 A | 4/1994 | Hartheimer et al. |
| 5,375,055 A | 12/1994 | Togher et al. |
| 5,592,378 A | 1/1997 | Cameron et al. |
| 5,655,088 A | 8/1997 | Midorikawa et al. |
| 5,689,652 A | 11/1997 | Lupien et al. |
| 5,715,402 A | 2/1998 | Popolo |
| 5,717,989 A | 2/1998 | Tozzoli et al. |
| 5,727,165 A | 3/1998 | Ordish et al. |
| 5,732,400 A | 3/1998 | Mandler et al. |
| 5,794,207 A | 8/1998 | Walker et al. |
| 5,802,499 A | 9/1998 | Sampson et al. |
| 5,809,483 A * | 9/1998 | Broka et al. ................. 705/37 |
| 5,832,462 A | 11/1998 | Midorikawa et al. |
| 5,924,082 A | 7/1999 | Silverman et al. |
| 5,926,801 A | 7/1999 | Matsubara et al. |
| 6,044,205 A | 3/2000 | Reed et al. |

FOREIGN PATENT DOCUMENTS

| | | |
|---|---|---|
| EP | 0 407 026 | 1/1991 |
| EP | 0 416 482 | 3/1991 |
| EP | 0 434 224 | 6/1991 |
| EP | 0512702 A2 * | 4/1992 |
| EP | 0 491 455 | 6/1992 |
| EP | 0 512 702 A2 | 11/1992 |
| EP | 0 762 304 | 3/1995 |
| GB | 1489571 | 10/1974 |
| GB | 1489571 | 10/1977 |
| GB | 1489572 | 10/1977 |
| GB | 1489573 | 10/1977 |
| GB | 1489574 | 10/1977 |
| GB | 2227625 | 8/1990 |
| GB | 2275296 | 9/1994 |
| GB | 2275297 | 9/1994 |
| GB | 2275298 | 9/1994 |
| GB | 2277177 | 10/1994 |
| GB | 2277178 | 10/1994 |
| GB | 2277389 | 10/1994 |
| JP | 05-314139 | 11/1993 |
| JP | 06-019926 | 1/1994 |
| JP | 06-096359 | 4/1994 |
| WO | WO91/14231 | 9/1991 |

OTHER PUBLICATIONS

Inside Market Data: "Delivery & Display #1: PHLX Seeks Rule: Vendors Must Show All Options Exchanges"; Apr. 25, 1994, vol. 9, No. 15.*

Fairlam: "A revolution in equities", Institutional Investor, Nov. 1995, vol. 29, n. 11, pp. 132-135.

"World Bank Procurement—India, Power (part 2 of 2)"; AsiaPulse News, Apr. 18, 2000, p. 0004.

D. P. Mazzella, "Flying High with Financial Databases", Wall Street Computer Review, Jun. 1985, pp. 36-44.

S. Hansell, "The Computer That Ate Chicago", Institutional Investor, Feb. 1989, pp. 180-188.

Behof et al., "Future Shock if Ratting the Future Pits", Business Week, Apr. 17, 1989, pp. 93-94.

C. M. Persanyi, "Global Custody: Take a Journey to 1992", ABA Banking Journal, , May 1990, pp. 96-100.

Instinet On-Line System User Documentation, copyright 1986, 1987, pp. 668-847.

Instin T Real-Time Trading Service, copyright 1993, pp. 26-208.

Instin T Real-Time Trading Services, copyright 1993, pp. 505-667.

Instinet List Trading, copyright 1995, pp. 221-487.

Ian Domowitz, "A Taxonomy of Automated Trade Execution Systems", Journal of International Money and Finance, vol. 12, No. 6, ages 607-631, Dec. 1993.

Amended Answer To First Amended Complaint And Counterclaim For Declaratory Judgment, Oct. 8, 20003.

Bloomberg's Responses To Reuters' Interrogatories Nos. 1-7, May 25, 2004.

Money Match Functional Specification, Version 1, Aug. 1990.

James Essinger, "Electronic Banking & Finance", Elsevier Science Publishers Ltd., Jul. 1990.

Fred J. Perkins, "NORDEX: automated trading for Nordic equities", Computers in the City 89, Proceedings of the conference held in London, Nov. 1989.

Japanese Office Action dated Nov. 9, 2004.

* cited by examiner

D2000-2 Group Credit Limits

| Group/Branch | Global Lim | Global Rem | Local Lim | Local Lim | Total Rem | Rank |
|---|---|---|---|---|---|---|
| | | | 0 | 0 | 0 B | A |
| | | | 0 | 0 | 0 B | A |
| | | | 0 | 0 | 0 B | A |
| | | | 0 | 0 | 0 B | A |
| | | | 0 | 0 | 0 B | A |
| | | | 0 | 0 | 0 B | A |
| | | | 0 | 0 | 0 B | A |
| | | | 0 | 0 | 0 B | A |
| | | | 0 | 0 | 0 B | A |
| | | | 0 | 0 | 0 B | A |
| | | | 95 | 0 | 0 B | A |
| | 150 | 0 | | | | A |

300     © REUTERS LIMITED 1995

FIG. 7

D2000-2 Change View

Views:
- System: Demo 1
- System: Demo 2
- System: FRA
- System: Forwards
- System: Options
- System: Spot Preview:

| SYSTEM FRA MARKET QUOTE | BEST QUOTE | QUANTITY | TRADE QUOTE | TRADE:QTY | LAST PRICE |
|---|---|---|---|---|---|
| USD 1*4 | / | / | * | / | * |
| USD 2*5 | / | / | * | / | * |
| USD 3*6 | / | / | * | / | * |
| USD 4*7 | / | / | * | / | * |
| USD 5*8 | / | / | * | / | * |
| USD 6*9 | / | / | * | / | * |

12:10:58 ETC....
12:10:58 ETC....
12:10:58 ETC....

[Help] [Quit] [OK]

© REUTERS LIMITED 1995

401 402 403 TRADE <YYTC> USER 404 405 406 407

MENU | SETUP | TRADE | MODIFY | DISPLAY | CANCEL | ADMIN

| | SYSTEM FRA | MARKET QUOTE | BEST QUOTE | QUANTITY | TRADE:QUOTE | TRADE:QTY | LAST PRICE |
|---|---|---|---|---|---|---|---|
| 1 | USD 1*4 b | 5.01/5.02 | /5.00H | L X L (4) | / | X | ↑ 4.92 G |
| 2 | USD 2*5 c | 5.50/5.51 | / | 1 X L + | / | X | ↑ 5.54 P |
| 3 | USD 3*6 a | 5.69/5.70 | a5.64/5.70a | (2) 4 X 6 | / | X | ↑ 5.68 C |
| 4 | USD 4*7 b | 5.76/5.77 | c5.75/5.83e | (2)5 X 5 | / | X | ↑ 5.86 P |
| 5 | USD 5*8 c | 5.84/5.85 | a5.76/5.93e | (4)M X L | / | X | ↑ 5.91 P |
| 6 | USD 6*9 b | 5.94/5.95 | /6.01c | L X M + | / | X | ↑ 5.89 G |

P  ▽5.60 P  ▽5.63 P  ▲5.68 P  ▲5.69 P  ▽5.66 G  ▽5.62 P  ▽5.60 G

408

A DEM 1M
25M B ID
CALLS 5/29

409
12:10:58 TC ID^SUBNAME BUY/SELL 10 DEMG TN-1.40^STATUS^
12:10:02 TC ID^SUBNAME BUY/SELL 5 DEMG TN-1.20^STATUS^

NO CURRENT COMMUNICATIONS

410

411

412

CNV CNTCT

1522 CCY PAGE NAME ^ REUTER SPOT RATES ^ CCY HIEURO^LO FXFX
1523 DEM DBFX DEUTSCHEFFT 1.5755.52 ^ DEM 138800 1.6715
1523 GBP LOYF LLOYDS LON 1.5005151 ^ GBP 1.5040 1.4952

FCNG 0Q23 RNG-AVON RUBBER PLC <AVON.L>RE DIRECTORATE

© REUTERS LIMITED 1995

FIG. 4A

| | SYSTEM FRA | MARKET QUOTE | BEST QUOTE | QUANTITY | TRADE:QUOTE | TRADE:QTY | LAST PRICE |
|---|---|---|---|---|---|---|---|
| 1 | USD 1*4 b | 5.01/5.02 | /5.00H | L X L ( ) | / | X | ↑ 4.92 G |
| 2 | USD 2*5 c | 5.50/5.51 | / | 1 X L + | / | X | ↑ 5.54 P |
| 3 | USD 3*6 a | 5.69/5.70 | a5.64/5.70a | (2) 4 X 6 | / | X | ↑ 5.68 C |
| 4 | USD 4*7 b | 5.76/5.77 | c5.75/5.83e | (2) 5 X 5 | / | X | ↑ 5.86 P |
| 5 | USD 5*8 c | 5.84/5.85 | a5.76/5.93e | (4) M X L | / | X | ↑ 5.91 P |
| 6 | USD 6*9 b | 5.94/5.95 | /6.01c | L X M + | / | X | ↑ 5.89 G |

MENU | SETUP | TRADE | MODIFY | DISPLAY | CANCEL | ADMIN — TRADE <YYTC> USER

P ▽5.60 P ▲5.69 P ▽5.63 P ▲5.68 P ▽5.62 P ▽5.66 G ▽5.60 G

A DEM 1M
25M B ID

CALLS 5/29

A USD3 6 * 5.63
SOFTMATCH

CONVERSATIONS

12:10:58 TC ID^SUBNAME BUY/SELL 10 DEMG TN-1.40^STATUS^
12:10:02 TC ID^SUBNAME BUY/SELL 5 DEMG TN-1.20^STATUS^

SOFTMATCH 624531 USD3*6 5.63 5 CALL IN BANK X
CHECKING CREDIT...
OK FOR ONLY 4

CNV CNTCT

1522 CCY PAGE NAME ^ REUTER SPOT RATES ^ CCY HIEURO^LO FXFX
1523 DEM DBFX DEUTSCHEFFT 1.5755.52 ^ DEM 138800 1.6715
1523 GBP LOYF LLOYDS LON 1.5005151 ^ GBP 1.5040 1.4952

FCNG 0Q23 RNG-AVON RUBBER PLC <AVON.L>RE DIRECTORATE

© REUTERS LIMITED 1995

BID USD3* 6 VAL: 09SEP94 MAT: 09NOV94

501 — Quote  Quantity ⟋502  OK
5.69   10   Quit

Cancel After  Min Ticket Size  Minimum Rank
0 m 30 s  1  A
⟍503  ⟍504  ⟍505

500                © REUTERS LIMITED 1995

FIG. 5A

Yours/Sell USD 3*6 VAL: 09SEP94 MAT: 09NOV94

506 — Quote   Quantity ⟋508   OK
5.69    10    Quit

Minimum Rank
A
⟍507

510                © REUTERS LIMITED 1995

FIG. 5B

| BCD BANK | BUY/SELL | DEM 3MF | -9.0 | M123456 |
| Qty 10 | Spot Rate 1.5670 | + Rate 9.0 | For Rate 1.56610 | 601 |
|  |  |  | OK NO DEAL |  |
| ⟍602 | ⟍603 | ⟍604 | © REUTERS LIMITED 1995 |  |

NEGOTIATED MATCHING SYSTEM

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

FIELD OF THE INVENTION

The present invention relates to a negotiated matching system that identifies potential counterparties to a transaction using criteria input by each user of the system and then enables communication between the counterparties so that the parties may negotiate the final terms and/or details of the transaction. The present invention further relates to a method of identifying potential counterparties to a transaction according to filtering criteria input by system users and then enabling communication between the counterparties so that they may negotiate the terms and/or details of the transaction.

BACKGROUND OF THE INVENTION

Automated dealing systems (e.g., for trading currencies, commodities, and the like) are increasingly replacing the conventional manner of dealing using a broker as an intermediary. When a broker is used to complete a transaction, anonymity of the counterparties is preserved either throughout the deal or until just prior to the completion of a transaction depending on the conventions of the particular market. The brokers are familiar with the trading practices of their clients and therefore help to prevent traders who do not want to trade with one another for whatever reason from dealing with one another. Removal of such human safeguards has lead to the development of automated checks and validations in the automated dealing systems.

For example, some known automated trading systems allow traders to enter credit information which is used to check the suitability of counterparties before the deal is completed and before the identity of the parties is revealed. One such system is described in U.S. Pat. No. 5,136,501 wherein, prior to the completion of a transaction, a credit check is performed to insure that each party is willing to extend sufficient credit to its potential counterparty. Another known trading system is described in European Patent Application 92303437.5 in which the system automatically matches offers and bids using credit ranking information entered by each trader.

These and other known trading systems have a number of drawbacks. First, these systems are only amenable to highly specified trading instruments in which all criteria on which a decision to trade is based are readily quantifiable and standardized in the industry and the system. For example, decisions to trade some types of highly specified financial instruments are based solely on the price of the instrument and the quantity available. These easily-defined criteria are easy to incorporate into an automated trading system. However, the known automated trading systems are not capable of accommodating types of financial instruments that are traded using more subjective, less-quantifiable criteria. For example, known automated trading systems do not provide traders with the opportunity to filter out potential deals with other traders who may be unacceptable trading partners on the basis of subjective criteria other than the party's credit, for example, geographic location or political or other competitive criteria. Hitherto, this has only been possible through the agency of a broker who may take into account his client's other types of less quantifiable, subjective criteria concerning parties his clients are willing to deal with while maintaining the anonymity of his clients. Therefore, there is a need for an electronic trading system which accommodates subjective, less-quantifiable trading criteria.

Second, the marketplace may create new, non-standardized types of trading instruments to fit its specific needs. The known electronic trading systems are not capable of accommodating these non-standardized trading instruments because the instrument specifications in these systems are pre-defined based on standardized trading instruments. Therefore, there is a need for an automated trading system which is capable of accommodating non-standardized trading instruments.

Third, in the known automated trading systems, once a trader has entered a bid or offer, the trader no longer has the discretion of negotiating the entered terms of the bid or offer. The system automatically executes trades when compatible offers and/or bids are found. In some systems, a trader may enter a "soft" offer or bid, wherein the trader retains the discretion to either execute or not execute the trade. However, the terms of such a soft offer or bid define the objective criteria that must be satisfied to create a firm offer or bid. The known systems provide no means by which a trader can input a mere "expression of interest" in a particular transaction wherein the trader need not provide predefined objective criteria which would make the expression of interest firm.

In other words, the known trading systems are designed to execute firm transactions when the system locates a bid and offer that match based on detailed specific information concerning the terms of the bid and offer input by the users. These systems do not provide a means by which two parties who are potentially interested in dealing with one another may be introduced to one another based on preliminary information input into the system, and then allowed to negotiate the terms of a transaction using a communication link.

Fourth, the known automated trading systems cannot accommodate credit-complex trading instruments. Credit-complex trading instruments are those for which the calculation of a trading party's risk or exposure at a given time is based on multiple elements and is therefore too complex to integrate into a large-scale trading system. Generally, in order to calculate its exposure, a bank must evaluate several types of risk, for example, credit risk, settlement risk, and liquidity risk. Credit risk is the effect of the transaction on the bank's overall books if the counterparty goes bankrupt before the transaction is completed. Credit risk is evaluated as the replacement value of the transaction assuming that the counterparty is unable to compete the transaction. Settlement risk is the risk that a bank will complete its half of the transaction and the counterparty will be unable to complete its half of the transaction, for example, because the counterparty goes bankrupt prior to settlement. Liquidity risk is the risk that the holder of an instrument will not be able to sell that instrument at a reasonable price when the holder wishes to liquidate the position.

The determination of credit risk is fairly straightforward for short-term transactions such as spot transactions which are settled as soon as the market allows because the risk that a counterparty will go bankrupt during the short period of time prior to settlement is very small. Therefore, it is likely that both parties will complete the settlement of the transaction.

However, the complexity of calculating credit risk increases significantly as the settlement period increases. For example, in forward markets, e.g., the forward foreign exchange and forward rate agreements markets, often transactions do not have a final settlement for several months, a year, or longer. Clearly, there is a greater risk that a counterparty will go bankrupt within this longer period of time prior to settlement. As a result, banks' methods of calculating their long term exposure, including both settlement and credit risk, become increasingly complex and take into account multiple factors.

Therefore, banks and other financial institutions use complex formulae and methods to calculate their potential exposure for each transaction based on a highly complex evaluation of the time decay of the value of money and risk, the institution's total exposure, and numerous other factors. Each financial institution has its own systems and procedures for evaluating its exposure. These credit and risk management procedures are highly confidential and not standardized by any means. As a result, to successfully accommodate these procedures into a single automated trading system, either the financial institutions must standardize their procedures or the implementers of the system must customize their system to accommodate each different institution. Neither of these options is a practicable solution to this problem because banks are not likely to standardize their credit and risk management processes and a customized trading system would be economically infeasible. Also, banks and other trading institutions are extremely protective of information regarding their credit and risk management procedures and may be unwilling to give out this information to third-party programmers who are designing a system or to put this information on line where other parties may be able to access it.

SUMMARY OF THE PRESENT INVENTION

In view of the above described problems associated with known automated trading systems, it is an object of the present invention to provide a negotiated matching system which introduces potential counterparties to a transaction based on a first, firm set of transaction parameters input into the system by each party, and then enables communication between the potential counterparties to negotiate a second, negotiated set of transaction parameters. A transaction is only completed when both sets of transaction parameters are agreed upon by all parties to the transaction. The sets of transaction parameters may vary for each market. Also, in some markets, traders may negotiate all transaction parameters.

A further object of the present invention is to provide a system which enables users to trade financial and other types of instruments based on objective criteria and subjective criteria which are not standardized and/or easily quantifiable.

It is a further objective of the present invention to provide a negotiated trading system which enables users to enter expressions of interest with respect to a type of transaction, wherein the user need not provide defined or objective criteria necessary to complete the transaction.

It is another objective of the present invention to provide a negotiated trading system which identifies parties who are potentially interested in transacting business and place these parties in communication with one another.

It is another objective of the present invention to provide a negotiated trading system which accommodates the numerous complex and non-standardized exposure evaluation procedures of various financial institutions within a single automated trading system while preserving the confidentiality of these procedures.

Yet another object of the present invention is to provide a matching system which automatically matches users making offers (offerors) or bids (bidders) with potential counterparties who are interested in the type of offer/bid being made by the offeror/bidder, wherein the parties are mutually acceptable trading partners for the particular category of transaction sought by the offeror, and wherein the identity of the parties to the transaction is not revealed until just before or at the time a deal has been struck.

The aforementioned objects, as well as other objects, of the present invention are achieved by providing a negotiated matching system with a filtering feature that filters the potential transactions to be displayed to a trader based on ranking and other transaction information input by the trader and potential counterparties. The ranking information provides an indication of how each user ranks other users in terms of acceptability as a counterparty to one or more types of transactions. Thus, counterparties who do not each achieve a minimum predetermined ranking score set by the other are filtered out. As a result, potential transactions between unacceptable counterparties are not displayed to the user, and unacceptable trading counterparties are not matched by the system. The other transaction information includes trading parameters, such as price and quantity of an instrument to be traded.

The negotiated matching system according to the present invention includes a plurality of remote terminals associated with respective potential counterparties and a communications network for permitting communication between the remote terminals and a matching computer and between the remote terminals themselves. Each user enters a first set of transaction parameters including ranking and other information into his or her remote terminal. The matching computer uses the first set of transaction parameters (ranking data, price data, size data and other parameters or attributes) from each user to identify potential transactions with potential counterparties. If potential transactions are identified, the respective parties are notified so that they may begin negotiation of a second set of transaction parameters. The second set of transaction parameters which may be negotiated by the parties to the potential transaction identifies by the system may consist of 1) some or all of the parameters in the first set of transaction parameters, 2) some parameters from the first set and other parameters not included in the first-set, or 3) only parameters not included in the first set. Both the first and second set of transaction parameters must match before the system will execute a transaction.

The system according to the present invention also distributes the bid and offer information entered into the system to the users of the system. Prior to their display to the users, the bids and offers may be filtered using the ranking data entered by the users, thereby limiting the bids and offers displayed to individual users. When a user sees a desirable bid or offer on his or her screen, the user may "hit" the bid or "take" the offer, thereby entering an offer corresponding to the bid or a bid corresponding to the offer. The matching computer then uses the first set of transaction parameters (e.g., ranking data, price data, size data and other parameters or attributes) entered by each party to the potential transaction to determine whether the potential counterparties are compatible. If so, the potential counterparties are notified so that they may begin to negotiate the second set of transaction parameters as described above. No transactions are executed unless the parties agree on both sets of parameters for the transaction.

Thus, the negotiated matching system according to the present invention only permits dealing between parties who are mutually acceptable counterparties based on the first set of transaction parameters (e.g., ranking, price, size and other "firm" parameters) and does not automatically execute transactions until the parties have agreed on all terms of the transaction.

A benefit of the negotiated matching system according to the present invention is that the complex and confidential credit evaluation and risk management procedures of various financial institutions are taken off line completely and left up to each individual party. This greatly simplifies the system needed to accommodate numerous financial institutions, does not require standardization of institution financial practices, and allows the institutions to keep their credit practices confidential.

Furthermore, the negotiated matching system according to the present invention provides a framework for matching potential counterparties without necessarily automatically executing transactions. The discretion to execute a transaction thus may remain with the traders themselves and is not surrendered to the system.

One embodiment of the negotiated matching system according to the present invention includes a matching computer; a plurality of remote terminals corresponding to a plurality of users, wherein the remote terminals enable the users to enter transaction data into the system; and a communications network for transmitting negotiating messages between two or more of the remote terminals in response to control signals from the matching computer. The matching computer is coupled to the plurality of remote terminals by the communications network. The matching computer matches potential counterparties to a transaction based on the transaction data entered by the users and generates the control signals when a potential match is identified.

A second embodiment of the present invention includes a matching computer; a plurality of remote terminals corresponding to a plurality of users, wherein the remote terminals enable the users to enter transaction data and ranking data into the system; and a communications network for transmitting negotiating messages between two or more of the remote terminals in response to control signals from the matching computer. The matching computer is coupled to the plurality of remote terminals by the communications network. The matching computer matches potential counterparties to a transaction by comparing the transaction data entered by the users and filtering the transaction data using the ranking data. The matching computer generates the control signals when a potential match is identified.

A method of identifying potential counterparties to a transaction according to the present invention includes the steps of receiving ranking data and transaction data from a plurality of remote terminals corresponding to a plurality of potential counterparties to a type of transaction; filtering the transaction data using the ranking data to identify for each user transactions with potential counterparties who are mutually acceptable based on the ranking data, thereby matching potential counterparties to a transaction; and transmitting negotiating messages between the potential counterparties, thereby enabling the potential counterparties to negotiate terms of the transaction.

Various additional advantages and features of novelty which characterize the invention are further pointed out in the claims that follow. However, for a better understanding of the invention and its advantages, reference should be made to the accompanying drawings and descriptive matter which illustrate and describe preferred embodiments of the invention.

BRIEF DESCRIPTION OF THE DRAWINGS

FIG. 3 provides an illustration of a sample screen according to an embodiment of the invention displayed on the remote terminal display of a party to a transaction for inputting ranking information;

FIG. 4A provides an illustration of a sample screen according to an embodiment of the invention displayed on the remote terminal display of a party to a transaction showing a market screen with a call delay;

FIG. 7 provides an illustration of a sample screen according to an embodiment of the invention displayed on the remote terminal display of a party to a transaction showing a choice box screen.

DETAILED DESCRIPTION

The negotiated matching system according to the present invention will now be described with reference to the accompanying drawings.

Figure 1:
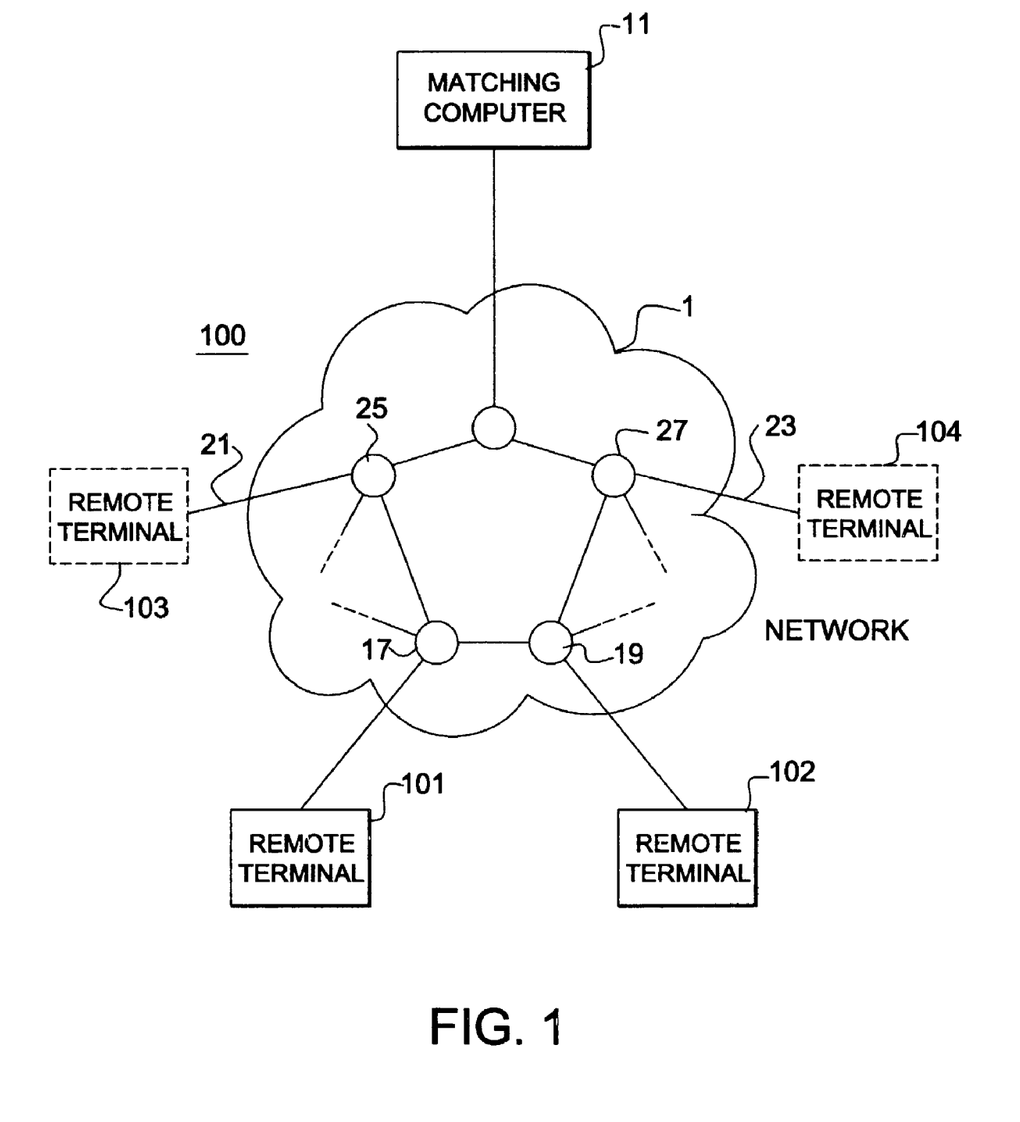
FIG. 1 provides a diagram of one configuration of the negotiated matching system according to the present invention.

With reference to FIG. 1, one possible configuration of the negotiated matching system 100 according to the present invention includes a matching computer 11 and remote terminals 101 and 102. The system contemplates a plurality of remote terminals whereby a large number of users have simultaneous access to the negotiated matching system; however, for description purposes, two remote terminals 101 and 102 and optional remote terminals 103 and 104 are shown in FIG. 1.

The matching computer 11 is connected to the remote terminals 101 and 102 through a communication network 1. Nodes 17 and 19 may also be inserted into the communication network 1 between matching computer 11 and remote terminals 101 and 102. These nodes 17 and 19 may be intelligent nodes which, for example, perform filtering operations or passive nodes (repeater stations) which merely transmit information from the matching computer 11 to the remote terminals 101 and 102. Connectors 21 and 23 maybe used to connect additional remote terminals (e.g., 103 and 104) and/or additional nodes (e.g., 25 and 27) to the network.

Remote terminals 101 and 102 also are connected via communication network 1. Remote terminals 101 and 102 may communicate with each other via network 1 once the filtering and matching process is completed by the matching computer 11. This operation will be described in further detail below with reference to FIGS. 3, 4, 4A, 5A, 5B and 6.

The communication network 1 may also include switching centers (not shown) which are configured as a conventional packet switching network so that, if the most direct route between remote terminals 101 and 102 becomes inoperable due to a malfunction in a part of the system, the routing can be varied to enable communication between the terminals 101 and 102. It will be appreciated that, in many situations, terminals 101 and 102 will be distributed around the globe.

The negotiated matching system according to the present invention may be realized using a number of different network configurations. For example, where nodes 17 and 19 are passive (repeaters), matching computer 11 performs all matching and filter operations for the system as will be described below. Where nodes 17 and 19 are intelligent nodes, these nodes may perform some filtering functions, while matching and additional filtering takes place in the matching computer 11. Filtering may also be performed by remote terminals 101 and 102. Particularly in a worldwide system, the use of intelligent nodes will prevent overloading of the computer or network and result in more efficient operation of the negotiated matching system.

Figure 2:
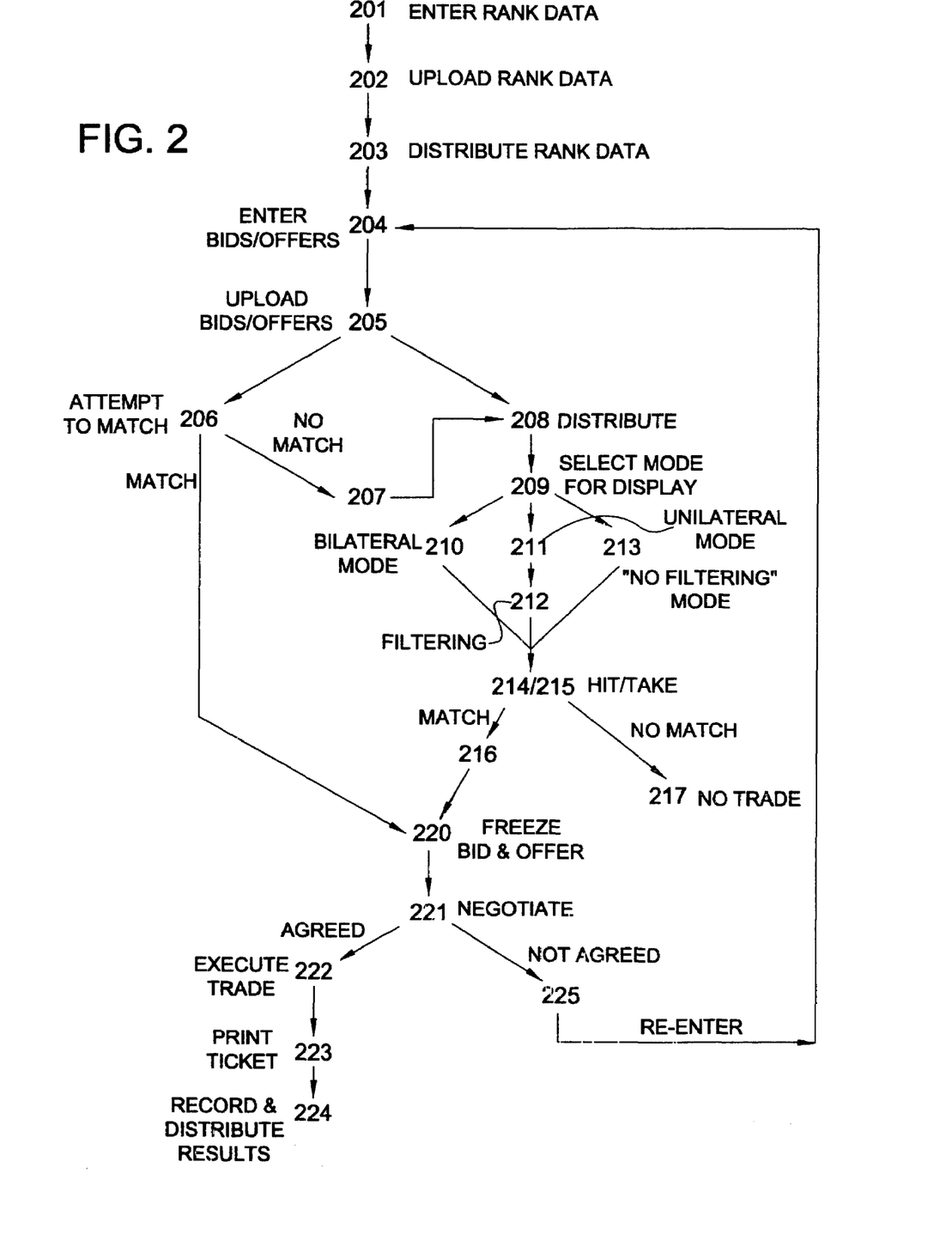
FIG. 2 provides a flow chart of the operation of the negotiated matching system according to the present invention.

FIG. 2. provides a flow chart which illustrates the overall operation of the negotiated matching system according to the present invention shown in FIG. 1 (with intelligent nodes such as 17 and 19). The functions of the matching computer 11 as described below may be performed using a configuration of hardware components, software components, or both. The system may accommodate a plurality of markets (e.g., foreign exchange, interest rate swaps, etc.). However, for purposes of simplicity, the operation of the system in a single market will be described below. The steps of operation are as follows.

Initial Operation

201—Each user enters ranking information (as described below with reference to FIG. 1).

202—ranking information from each user is uploaded to the matching computer 11 and stored.

203—the ranking information is then distributed by the matching computer 11 to intelligent nodes 17, 19, etc. where it is stored (this step is optional depending on the configuration of the system—if there are no intelligent nodes, storage occurs only in the matching computer 11).

204—the users enters bids and offers including firm (non-negotiable) and soft (negotiable) parameters pertaining to the bids and offers (e.g., price, quantity, expiration terms, acceptable credit ranking) into the system using their remote terminals. Traders may enter bids and offers into the system at any time.

205—the matching computer 11 uploads and stores entered bids/offers with their corresponding parameters.

Matching Operation

206—the matching computer attempts to match bids and offers entered by the users based on the parameters of the entered bids and offers and the ranking information entered by the users. The bids and offers entered by the users may also be matched with standing orders or resting orders already in the system.

220—if a match between a bid and an offer is identified, the matching computer 11 then freezes (places on hold) the bid and offer so that it is not displayed to other users (in a different embodiment of the system, the offer or bid is not held such that other users may select it simultaneously and attempt to negotiate a better deal with the offeror or bidder).

221—once the offer and bid are frozen, the system automatically signals counterparties to enable electronic communication between the two parties to the potential transaction.

222—once the traders have agreed to the transaction (e.g., each party has performed its credit and risk management procedures in which any objective and/or subjective criteria may be evaluated and is able to complete the transaction) and an agreement has been reached as to all firm and soft parameters of the transaction, the remote terminals of the offeror and bidder send signals to the matching computer 11 to execute the transaction and remove the offer and bid from the system.

223—(optional) trade tickets are printed for each party to confirm the transaction.

224—the transaction is recorded by the matching computer 11, and (optional) the price and quantity of the transaction is broadcast to the remote terminals of all traders on the system.

225—if the traders are not successful in negotiating a deal, the offeror or bidder may have the option of re-entering the offer or bid into the system.

207—if no matches are identified, the bids and offers are distributed to the users of the system as described below in step 208.

Display Operation

208—either simultaneously with, before, or after trying to match the entered bids and offers described above in step 206 (depending on the desired implementation of the system), the matching computer 11 distributes the bids/offers to the intelligent nodes 17, 19, etc. where they are optionally stored.

209—each user selects a display mode (no filtering, unilateral filtering, or bilateral filtering or a combination of these).

210—if the bilateral display mode is selected, the node corresponding to the user's remote terminal or the remote terminal itself filters all offers and bids in the market using the ranking information from each user to determine whether parties are acceptable to one another. The remote terminal then displays all offers/bids in the market which are mutually acceptable to the user and a potential counterparty.

211—if the unilateral filtering display mode is selected, the user may select whether filtering is performed using the user's ranking information or potential counterparties' ranking information.

212—once the user has made this selection, the node corresponding to the user's remote terminal or the remote terminal itself filters the offers and bids in the market based on ranking information as requested by the user and displays all acceptable offers/bids in the market.

213—if the "no filtering" display mode is selected, the node corresponding to the user's remote terminal transmits for display all offers/bids in the market.

214—once the filtered or unfiltered bids/offers are displayed, the user may "hit" or "take" one of the displayed bids or offers.

215—the hit and take messages are uploaded to the matching computer 11.

216—if the taken offer or hit bid is available to the trader based on the ranking information and the bid/offer parameters entered by both the trader and the potential counterparty, the matching computer 11 freezes the offer or bid so that it is not displayed to other users as described in step 220 above, and the steps following step 220 are performed as described above.

217—if the transaction is not available to the user, for example, based on the ranking information entered by both the user and the potential counterparty or the timing of the hit or take, the user is informed that the transaction is not available.

Unlike bids and offers entered into the system in step 204, when a party hits a bid or takes an offer in step 214, the party in effect enters an offer with terms corresponding to the hit bid or a bid with terms corresponding to the taken offer. If the matching process does not result in a potential transaction, the hit or take is removed from the system without any effect on the standing order book.

As described above, each trader may personalize his or her display screen based on the information the trader desires to see. For example, for each instrument, the trader may view all bids and offers available in the market (no filtering); only the offers and bids from counterparties ranked above a certain ranking entered by the trader (unilateral filtering); only the offers and bids available to the trader based on other parties' ranking of the trader (unilateral filtering); only bids and offers that are mutually acceptable (bilateral filtering); or a combination of several options. According to one embodiment of the negotiated matching system according to the present invention, each trader screen is arranged to display all offers and bids available in the market (no filtering) in one window of the display screen and the bids and offers available to the trader based on mutual acceptability (bilateral filtering) in another window on the display screen (see FIG. 4). However, other arrangements are contemplated within the scope of the present invention. As a result, a trader may obtain a personalized view of the market. The filtering necessary to provide the selected personalized view of the market may be performed by remote terminals 101 and 102, intelligent nodes such as 17 and 19, or the matching computer 11.

With reference to FIGS. 3, 4, 4A, 5A, 5B and 6, the step-by-step operation of a negotiated matching system according to the present invention will now be described in detail.

With reference to FIG. 3, prior to or during commencement of trading activities, each party enters ranking information indicating the party's willingness to trade with other parties (i.e., counterparties) in the system, for example, using a display screen 300. The ranking information may take the form of a banding scheme, for example, using a system of letters to represent each band of counterparties listed in column 301 as shown in column 302. The ranking scheme may be based on specific values such as monetary value that parties are willing to lend to and borrow from others or less tangible forms of evaluation such as general relations between companies, the country of origin, or any type of objective or subjective criteria as desired by the ranking party. An objective ranking scheme may be as follows:

| RANKING | VALUE (size of counterparty) |
| --- | --- |
| A | very large (assets > $1 B) |
| B | large (assets > $500 M) |
| C | medium/large (assets > $250 M) |
| D | medium (assets > $100 M) |
| E | medium small (assets > $50 M) |
| F | small (assets < $50 M) |

Similarly, a subjective ranking scheme may be as follows:

-continued

| RANKING | VALUE |
| --- | --- |
| A | preferred business associates |
| B | businesses with good reputation |
| C | businesses with average reputations |
| D | businesses with poor reputations |

The ranking information entered by each user of the system may differ for each type of instrument (each market). For example, each user may enter different ranking information for different markets such as forward foreign exchange trading, lending, forward rate agreements, interest rate swaps, etc. The user may also enter different ranking information within each market depending on the direction of the currency flow. For example, a user's rank of a counterparty for lending purposes may be different from the rank for borrowing purposes. Furthermore, the ranking scheme for each type of transaction may be based on different criteria as desired by the individual user. The only constant is the symbols indicating the ranking bands or categories (e.g., A, B, C, D, E, F, etc.). These categories may have different values for each user in each market.

There may also be a series of ranks by which counterparties may be filtered multiple times based on different criteria. For example, a first filtering process may be based on size of counterparties, and a second filtering process may be based on the assets of the counterparties.

For example, using the objective or subjective ranking scheme provided above, Bank 1 might enter the following ranking information:

| COUNTERPARTY | RANKING |
| --- | --- |
| Bank 2 | C (medium/large) |
| Bank 3 | A (very large) |
| Bank 4 | D (medium) |
| Similarly, Bank 2 might enter the following ranking information: | |
| Bank 1 | B (good reputation) |
| Bank 3 | A (referred business associate) |
| Bank 4 | C (average reputation) |

Other ranking schemes such as numeric ranks and yes/no ranks may also be used.

Users may change their rankings of other counterparties at any time. If a user enters new ranking information, the system will update its information as well as optionally update the information displayed on all counterparties' displays to dynamically reflect the new ranking. Therefore, the information stored in the matching computer 11 and displayed on the counterparties' display screens is automatically updated as rankings are modified by the users.

The ranking information from both banks is uploaded to matching computer 11 and stored there, for example, in a random access memory device. In another configuration of the system according to the present invention, the ranking information is uploaded into matching computer 11 from the remote terminals 101 and 102, stored, and then distributed by the matching computer 11 to intelligent nodes (such as 17 and 19 shown in FIG. 1) which perform filtering operations to provide each user with a personalized view of the market. Thus, the location of the filtering processes within the network may be varied according to the desires of the user and implementer of the system. However, the matching and at least some filtering operations are preferably performed in the same location, for example, in matching computer 11.

Figure 4:
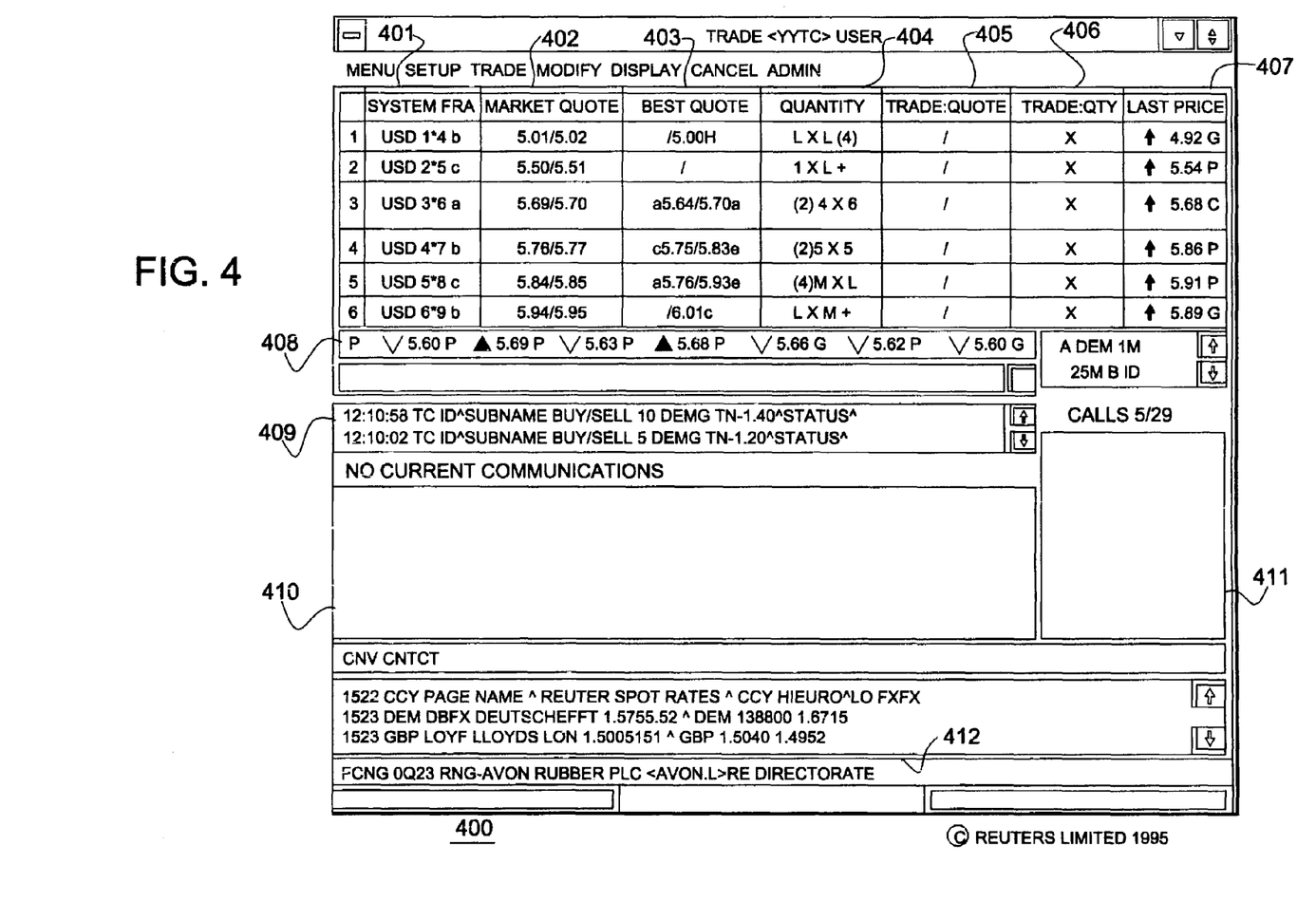
FIG. 4 provides an illustration of a sample screen according to an embodiment of the invention displayed on the remote terminal display of a party to a transaction showing a market screen.

The user then selects which market he or she wishes to view, for example using a choice box as illustrated in FIG. 7 selected from the "Display" menu of screen 400 (see FIG. 4).

Once a market is selected, each trader views a market screen such as the forward rate agreement (FRA) market shown in FIG. 4. On the screen 400 shown in FIG. 4, a trader may select from six different instruments as listed in column 401 (the third instrument, U.S. dollar three month to six month forward rate agreements, is selected). Once the trader has selected an instrument, for example by clicking on the appropriate instrument box using a mouse (not shown), the trader is able to enter bids, offers, etc. for the selected instrument. The trader is able to view the continuous activity of all instruments in both the market row (e.g., rows 1-6) and price display box 408 in which market prices are dynamically displayed whether or not the trader has selected a particular instrument.

In each instrument row 1-6, there are a number of columns, each of which provides different information to the trader. Column 401 provides the name of the instrument(s) and optionally the ranking by which the displayed bids and offers are filtered. Column 402 provides the best bid and offer price available in the market (the "market quote"). Column 403 provides the best bid and offer price available in the market based on the filter criteria (the "best quote"). Rank information indicating the trader's rank of the party making the bid or offer may also be displayed in this column ("a" rankings shown for the selected instrument). Column 404 provides the quantity available to the trader: the quantity shown is that available at the "best quote" unless there is no "best quote", in which case the quantity available at the "market quote" is optionally displayed. Optionally, both quantities may be displayed. A small number or "+" sign displayed next to the quantity indicates the number of trade tickets needed to complete the transaction at the displayed quantity (i.e., the transaction will involve more than two parties). The "+" sign may indicate, for example, that the number of trade tickets needed to complete the transaction is greater than five. Columns 405 and 406 display the price and quantity of any bids or offers in the system which have been entered by the trader. Column 407 indicates the direction of change in the last trade as well as the amount of the last trade.

Notably, the trader may access the credit limit entry screen shown in FIG. 3 and change counterparty rankings at any time by selecting the screen from a menu such as the "Admin" menu shown at the top of screen 400.

Other information such as help information or financial news may also be displayed on screen 400, for example, in box 412.

Figure 5A:
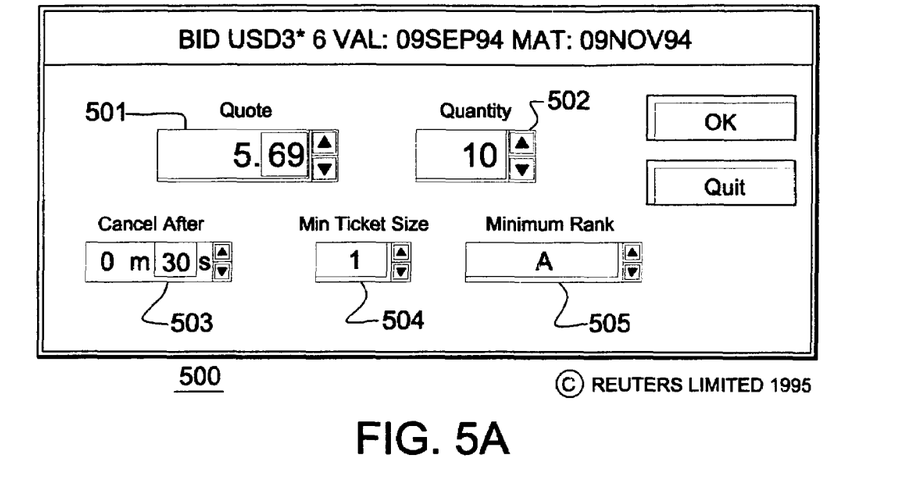
FIG. 5A provides an illustration of a sample screen according to an embodiment of the invention displayed on the remote terminal display of a party to a transaction showing a bid entry screen.
Figure 5B:
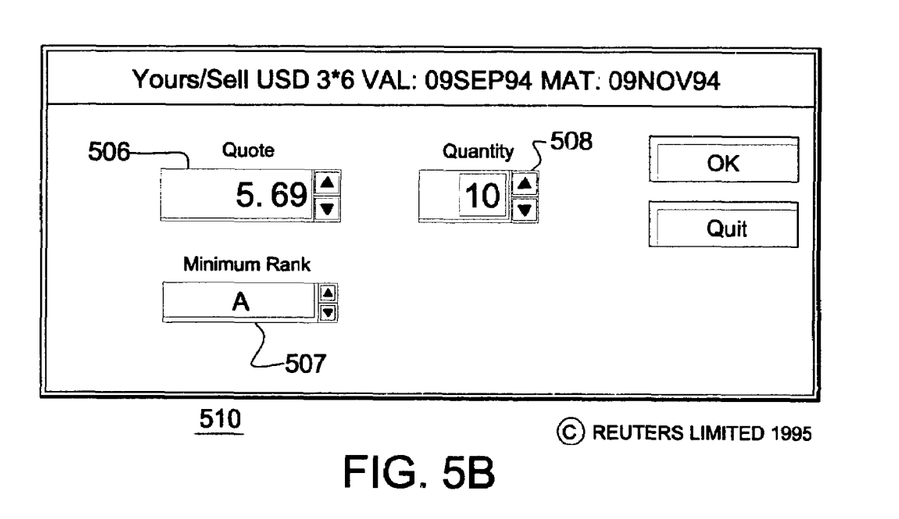
FIG. 5B provides an illustration of a sample screen according to an embodiment of the invention displayed on the remote terminal display of a party to a transaction showing a hit box entry screen.

The trader may enter bids, offers, hit and takes into the system, for example, using entry screens shown in FIGS. 5A and 5B. As shown in bid box 500 in FIG. 5A, the trader may, for example, enter a bid to buy a quantity of 10 (box 502) at a price of 5.69 (box 501). The trader may set the duration of the offer in box 503 and the minimum ticket size in box 504. A trader may enter an offer to sell using a similar order entry box (not shown). The trader also inputs a ranking limit with its bid in box 505 such that it is only willing to be matched with offers from counterparties which it ranks the same as or higher than the input rank limitation if bilateral filtering is implemented. The entered ranking limit also ensures that the bid will only be displayed to those potential counterparties whom the trader ranks equal to or greater than the entered ranking limit. For example, if the trader inputs a ranking limit of C in box 505, its bid will only be displayed to potential counterparties that the trader ranks as an C or higher. A ranking of A is displayed in box 505, indicating that the bid will only be displayed to counterparties ranked as an A by the bidder.

Similarly, in the "Yours" (hit) box 510 displayed on one of remote terminals 101-104 as shown in FIG. 5B, the trader enters a quantity in box 508 shown in hit box 510 and a ranking in box 507 of hit box 510. The price displayed in box 506 of hit box 510 indicates the bid price that the trader wishes to hit.

Based on the price, quantity, and ranking information entered into the system by the trader, the system attempts to locate a match for the trader's order (bid or offer). The match may also occur when one party (a "market taker") hits a bid or takes an offer of a "market maker" displayed on the market screen 400. The matched transaction may be displayed on the market screen 400, for example, in box 409 in FIG. 4. The operation of the system from commencement of trading activities through the matching operation may be referred to as the "initiation" stage of operation.

Following the initiation stage of operation, the negotiated matching system according to the present invention may operate in several different ways. The system may enable free-style or more structured communication between the "matched" parties. This stage of operation of the system may be referred to as the "completion" stage, wherein the terms of the transaction are finalized through negotiations between the matched potential counterparties.

At the completion of the initiation stage of operation, the identities of the parties are revealed so that they may negotiate the outstanding terms of the transaction in the completion stage.

Figure 6:
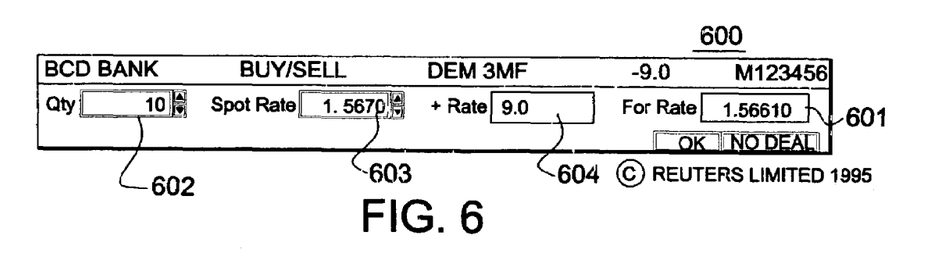
FIG. 6 provides an illustration of a sample screen according to an embodiment of the invention displayed on the remote terminal display of a party to a transaction showing a market maker's box screen.

According to one embodiment of the present invention as illustrated in FIG. 6, after the system has matched potential counterparties to a transaction, a window 600 is automatically displayed to each party. In this more structured implementation of the system according to the present invention, the transaction dates and instrument price are firm, meaning that they are no longer negotiable between the potential counterparties. However, the quantity and spot rate remain "soft" or negotiable between the parties. Market conventions may allow one party, such as the market maker to choose values for certain soft terms, such as the spot rate, such that the market taker may only accept or decline the spot rate chosen by the market maker. Other soft terms, such as quantity, may be determined by the minimum of the two quantities entered by the parties to the transaction. Which terms remain negotiable and the structure of the negotiations relating to these terms may be set to correspond to market conventions and/or to the desires of the implementers and users of the negotiated matching system.

The box 600 shown in FIG. 6 is a market maker's box which enables the trader to adjust both the quantity and the spot rate. The example shown in FIG. 6 is used in forward foreign exchange transactions, such that the forward points shown in box 604 are firm for both parties once the match has occurred. However, both the quantity (box 602) and the spot rate (box 603) are soft and may be negotiated prior to completion of the transaction. The rate shown in box 601 indicates the sum of the forward points and the spot rate selected by the market maker.

According to another embodiment of the negotiated matching system according to the present invention, all terms entered by the parties to the transaction may be negotiated after the potential match has occurred. These terms may be negotiated using free-style dialog entered, for example, using a keyboard and mouse (not shown) and displayed for example in box 410 of screen 400. In this embodiment of the present system, once a match occurs, the system automatically initiates a "call" from one party to the other party which is displayed, for example, in box 411 of screen 400. An example of a display screen from such an embodiment is provided in FIG. 4A.

Thus, the negotiated matching system according to the present invention creates tentative matches between potential counterparties, wherein neither party is initially committed to the transaction and the identities of the parties are unknown. The system does not automatically execute transactions. Instead, the system introduces compatible counterparties who are provided with an opportunity to communicate with one another prior to execution of the transaction to negotiate some or all terms of the transaction.

The negotiations between potential counterparties to a transaction may take the form of pre-defined, structured dialogue (e.g., predefined sentences), free dialogue, or a combination of both as desired by the users and implementers of the system. A structured dialogue format may be desirable to restrict the aspects of the transaction which may be negotiated by the parties after a match has occurred. For example, the implementers of the system may provide structured dialogue regarding price (so that the traders cannot renegotiate the price of each unit), but may allow the parties to renegotiate the quantity available at that price based on their off-line credit analysis. The communications between the parties may also be recorded, for example, to enable parties to verify the agreed upon transaction terms at a later time.

The potential counterparty negotiations which take place in the negotiated matching system according to the present invention may be accomplished using a pre-formatted display window, text format entered on a keyboard, through a speech recognition system which converts spoke words into text, or by verbal communication via a telephone. Communication may also be accomplished using a visual format in which the remote terminal of each user is provided with a video camera and microphone to enable traders to communicate "face-to-face."

Possible video communication systems for use in the negotiated matching system according to the present invention are described in U.S. Pat. Nos. 4,525,779; 4,531,184; 4,555,781; and 5,034,916 which describe several types of conversational video systems.

In the embodiments of the negotiated matching system according to the present invention as described above, matches are identified by the system based on ranking, price and quantity as input by each user. However, the negotiated matching system according to the present invention is capable of accommodating types of transactions that have less specific parameters. For example, the system may be used to sell real estate, wherein a potential seller enters the location, square footage, and price range of his house. In response, the system will provide potential counterparties who are interested in houses having those characteristics and are unilaterally or bilaterally ranked as acceptable counterparties.

In other words, the negotiated matching system according to the present invention may accommodate a range of markets from those in which highly specified instruments are traded to those in which loosely or subjectively defined instruments are traded. Known trading systems cannot accommodate the subjectively defined instruments because the known systems do not provide the necessary personalized negotiation opportunity as does the present invention.

While the present invention has been particularly described with reference to the preferred embodiments, it should be readily apparent to those of ordinary skill in the art that changes and modifications in form and details may be made without departing from the spirit and scope of the invention. It is intended that the appended claims include such changes and modifications.

We claim:

1. A method of conducting a transaction for a trading instrument between counterparties via a negotiated matching system comprising a matching computer and a communication network in communication with the matching computer and in communication with trading terminals, the method comprising:

receiving at the matching computer via the communication network first trading parameters for a trading instrument from a first trader via a first trading terminal, the first trading parameters comprising at least a first price for the trading instrument;

receiving at the matching computer via the communication network first trading parameters for the trading instrument from a second trader via a second trading terminal, the first trading parameters from the second trader comprising at least a second price for the trading instrument;

matching, via the matching computer, the first trading parameters from the first and second traders to identify the first trader and the second trader as potential counterparties for a tentative trading transaction, the matching occurring anonymously with respect to the potential counterparties;

after the step of matching, notifying the counterparties of the tentative trading transaction via the communication network, the step of notifying including automatically revealing to the counterparties the identity of the counterparties so that they may negotiate outstanding terms of the tentative trading transaction;

enabling electronic communication between the counterparties to negotiate at least a second trading parameter of the tentative trading transaction;

receiving via the communication network information indicating agreement between the counterparties of all trading parameters of the tentative trading transaction; and after the step of receiving information, completing the transaction between the counterparties.

2. The method of claim 1, further comprising the step of completing settlement of the transaction.

3. The method of claim 1, wherein the second trading parameters comprise all of the first trading parameters from the first and second traders.

4. The method of claim 1, wherein the second trading parameters do not include the first trading parameters from the first and second traders.

5. The method of claim 1, wherein the step of matching comprises matching the first price exactly with the second price.

6. The method of claim 1, wherein the trading instrument is a financial instrument.

7. The method of claim 6, wherein the financial instrument is a foreign exchange instrument.

8. The method of claim 1, wherein the second trading parameters comprise some of the first trading parameters from the first and second traders.

9. The method of claim 8, wherein the second trading parameters comprise trading parameters in addition to the some of the first trading parameters from the first and second traders.

10. The method of claim 1, wherein, for the step of receiving first trading parameters from the first trader, the first trading parameters further comprise a first quantity for the trading instrument.

11. The method of claim 10, wherein, for the step of receiving first trading parameters from the second trader, the first trading parameters further comprise a second quantity for the trading instrument.

12. The method of claim 1, wherein, for the step of receiving first trading parameters from the first trader, the first trading parameters further comprise one of first buy parameters and first sell parameters for the trading instrument.

13. The method of claim 12, wherein, for the step of receiving first trading parameters from the second trader, the first trading parameters comprise one of second buy parameters for the trading instrument, second sell parameters for the trading instrument, an acceptance of the first buy parameters from the first trader, and an acceptance of the first sell parameters from the first trader.

14. The method of claim 13, wherein, for the steps of receiving first trading parameters, each of the buy parameters include a bid, each of the sell parameters include an offer, the acceptance of the first buy parameters includes a hit, and the acceptance for the first sell parameters includes a take.

15. A negotiated matching system comprising:
a communication network in communication with a plurality of trading terminals; and
a matching computer in communication with the communication network, the matching computer comprising:
a processor; and
a computer readable storage medium containing instructions instructing the processor to perform steps comprising:
receiving first trading parameters for a trading instrument from a first trader via a first trading terminal, the first trading parameters comprising at least a first price for the trading instrument;
receiving first trading parameters for the trading instrument from a second trader via a second trading terminal, the first trading parameters from the second trader comprising at least a second price for the trading instrument;
matching the first trading parameters from the first and second traders to identify the first trader and the second trader as potential counterparties for a tentative trading transaction, the matching occurring anonymously with respect to the potential counterparties;
after the step of matching, notifying the counterparties of the tentative trading transaction, the step of notifying including automatically revealing to the counterparties the identity of the counterparties so that they may negotiate outstanding terms of the tentative trading transaction including at least a second trading parameter of the tentative trading transaction;
receiving information indicating agreement between the counterparties of all trading parameters of the tentative trading transaction; and
after the step of receiving information, completing the transaction between the counterparties.

16. The negotiated matching system of claim 15, wherein the computer readable storage medium contains further instructions instructing the processor to perform the step of completing settlement of the transaction.

17. The negotiated matching system of claim 15, wherein the second trading parameters comprise all of the first trading parameters from the first and second traders.

18. The negotiated matching system of claim 15, wherein the second trading parameters do not include the first trading parameters from the first and second traders.

19. The negotiated matching system of claim 15, wherein the step of matching comprises matching the first price exactly with the second price.

20. The negotiated matching system of claim 15, wherein the trading instrument is a financial instrument.

21. The negotiated matching system of claim 20, wherein the financial instrument is a foreign exchange instrument.

22. The negotiated matching system of claim 15, wherein the second trading parameters comprise some of the first trading parameters from the first and second traders.

23. The negotiated matching system of claim 22, wherein the second trading parameters comprise trading parameters in addition to the some of the first trading parameters from the first and second traders.

24. The negotiated matching system of claim 15, wherein, for the step of receiving first trading parameters from the first trader, the first trading parameters further comprise a first quantity for the trading instrument.

25. The negotiated matching system of claim 24, wherein, for the step of receiving first trading parameters from the second trader, the first trading parameters further comprise a second quantity for the trading instrument.

26. The negotiated matching system of claim 15, wherein, for the step of receiving first trading parameters from the first trader, the first trading parameters further comprise one of first buy parameters and first sell parameters for the trading instrument.

27. The negotiated matching system of claim 26, wherein, for the step of receiving first trading parameters from the second trader, the first trading parameters comprise one of second buy parameters for the trading instrument, second sell parameters for the trading instrument, an acceptance of the first buy parameters from the first trader, and an acceptance of the first sell parameters from the first trader.

28. The negotiated matching system of claim 27, wherein, for the steps of receiving first trading parameters, each of the buy parameters include a bid, each of the sell parameters include an offer, the acceptance of the first buy parameters includes a hit, and the acceptance for the first sell parameters includes a take.

29. A computer readable medium having stored thereon computer-readable instructions for performing steps comprising:
receiving via a communication network first trading parameters for a trading instrument from a first trader via a first trading terminal, the first trading parameters comprising at least a first price for the trading instrument;
receiving via a communication network first trading parameters for the trading instrument from a second trader via a second trading terminal, the first trading parameters from the second trader comprising at least a second price for the trading instrument;
matching via a matching computer the first trading parameters from the first and second traders to identify the first trader and the second trader as potential counterparties for a tentative trading transaction, the matching occurring anonymously with respect to the potential counterparties;
after the step of matching, notifying via the communication network the counterparties of the tentative trading transaction, the step of notifying including automatically revealing to the counterparties the identity of the counterparties so that they may negotiate outstanding terms of the tentative trading transaction including at least a second trading parameter of the tentative trading transaction;

receiving via the communication network information indicating agreement between the counterparties of all trading parameters of the tentative trading transaction; and after the step of receiving information, completing the transaction between the counterparties.

30. The computer readable storage medium of claim 29, wherein the steps further comprise completing settlement of the transaction.

31. The computer readable storage medium of claim 29, wherein the second trading parameters comprise all of the first trading parameters from the first and second traders.

32. The computer readable storage medium of claim 29, wherein the second trading parameters do not include the first trading parameters from the first and second traders.

33. The computer readable storage medium of claim 29, wherein the step of matching comprises matching the first price exactly with the second price.

34. The computer readable storage medium of claim 29, wherein the trading instrument is a financial instrument.

35. The computer readable storage medium of claim 34, wherein the financial instrument is a foreign exchange instrument.

36. The computer readable storage medium of claim 29, wherein the second trading parameters comprise some of the first trading parameters from the first and second traders.

37. The computer readable storage medium of claim 36, wherein the second trading parameters comprise trading parameters in addition to the some of the first trading parameters from the first and second traders.

38. The computer readable storage medium of claim 29, wherein, for the step of receiving first trading parameters from the first trader, the first trading parameters further comprise a first quantity for the trading instrument.

39. The computer readable storage medium of claim 38, wherein, for the step of receiving first trading parameters from the second trader, the first trading parameters further comprise a second quantity for the trading instrument.

40. The computer readable storage medium of claim 29, wherein, for the step of receiving first trading parameters from the first trader, the first trading parameters further comprise one of first buy parameters and first sell parameters for the trading instrument.

41. The computer readable storage medium of claim 40, wherein, for the step of receiving first trading parameters from the second trader, the first trading parameters comprise one of second buy parameters for the trading instrument, second sell parameters for the trading instrument, an acceptance of the first buy parameters from the first trader, and an acceptance of the first sell parameters from the first trader.

42. The computer readable storage medium of claim 41, wherein, for the steps of receiving first trading parameters, each of the buy parameters include a bid, each of the sell parameters include an offer, the acceptance of the first buy parameters includes a hit, and the acceptance for the first sell parameters includes a take.

* * * * *